March 7, 1944. J. SEBO 2,343,388
VAPOR COOLING FOR MOTORS
Filed May 10, 1943
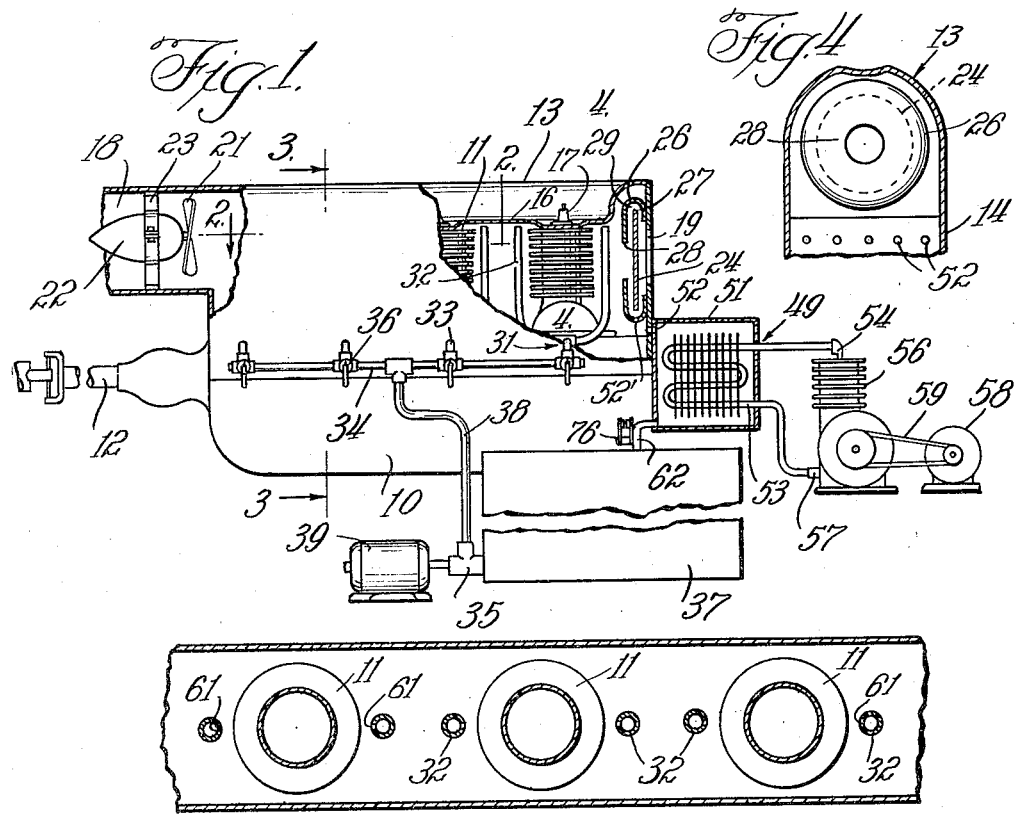
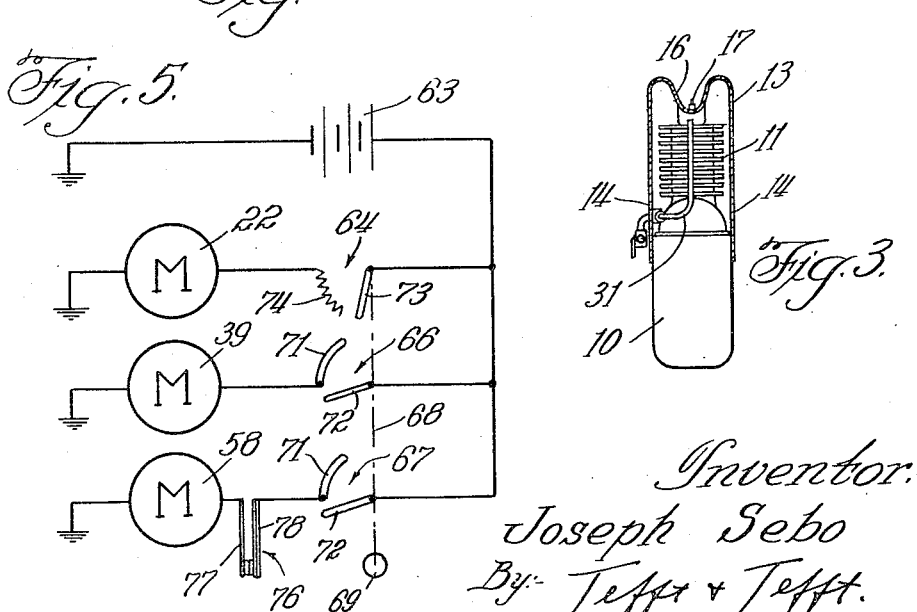
Inventor:
Joseph Sebo
By:- Tefft & Tefft
Attys.

Patented Mar. 7, 1944

2,343,388

UNITED STATES PATENT OFFICE 2,343,388

VAPOR COOLING FOR MOTORS

Joseph Sebo, Pekin, Ill., assignor of one-fourth to Charles K. Woodin, Chicago, and one-fourth to Edwin V. Champion and Fredric J. Lee, Peoria, Ill.

Application May 10, 1943, Serial No. 486,277

5 Claims. (Cl. 123—170)

This invention relates generally to a cooling system for an internal combustion engine and in particular to a cooling system in which water is directed against the engine portions to be cooled and cooling is accomplished by the evaporation of the water due to the heat transferred to the water from such engine portions.

The cooling of an engine by air is, of course, well known. This method of cooling has been found generally to be satisfactory in the cooling of small stationary engines and in engines in mobile craft which are exposed directly to the flow of air created by movement of the craft. However, the air cooling of engines in a central power unit used for either stationary or mobile purposes has been generally unsatisfactory because of the inability of air currents alone to adequately provide for the removal of heat in sufficient quantities to assure a proper and prolonged continuous operation of the central power unit. Although water cooling alone may be used, this usually requires either a plentiful source of cooling water or relatively large, heavy and expensive radiating surfaces in conjunction with a limited supply of cooling water.

It is an object of this invention to provide an improved cooling system for a combustion type engine.

A further object of this invention is to provide a cooling system for an engine in which system air and water are introduced separately adjacent the portions of the engine to be cooled to efficiently cool such portions.

Yet another object of this invention is to provide an engine cooling system having both air and water as a cooling medium, in which means are provided to reuse the air and water for cooling purposes.

A still further object of this invention is to provide an engine cooling system, which is simple and inexpensive in construction, selectively adjustable to accomplish cooling effects in accordance with the conditions of engine operation, and efficient in operation.

A feature of this invention is found in the provision of a system for cooling the cylinder of an engine which system includes an air duct in which the cylinder is located. Means for directing a spray of water in opposite directions toward the cylinder is located in the air duct for spraying the cylinder with the water thus sprayed being vaporized by the heat removed from the cylinder and mixed with the air in the air duct to be carried away from the cylinder. The flow of water to the spray means is selectively controlled to vary the cooling effect on the cylinder.

Another feature of this invention is found in the provision of a system for cooling a plurality of engine cylinder portions, which includes passage means for directing air about the cylinder portions, and water spray means corresponding to the cylinder portions located in the passage means adjacent a corresponding cylinder portion and adapted to direct water against the cylinder portion, with the air flow carrying the resultant vaporous mixture out of the passage means.

Further objects, features and advantages of this invention will become apparent from the following description when taken in connection with the accompanying drawing in which:

Fig. 1 shows the complete cooling system of this invention, with portions thereof shown in section to more clearly show its construction;

Fig. 2 is an enlarged fragmentary sectional view as seen along line 2—2 in Fig. 1;

Fig. 3 is a reduced sectional view taken along the line 3—3 in Fig. 1;

Fig. 4 is a fragmentary sectional view as seen along the line 4—4 in Fig. 1; and Fig. 5 illustrates diagrammatically a control circuit for the cooling system of this invention.

The invention is illustrated in the drawing as applied to an airplane engine which may be located within the fuselage portion of the airplane. It is readily appreciated that in large transport and cargo aircrafts considerable strength must be provided in engine-carrying wing structures so that these structures will safely carry the engine loads and in addition withstand all operating stresses. A wing-carried engine further is not readily accessible for maintenance and servicing purposes. However, these wing-carried engines, by virtue of their wing position, are readily acted upon by air currents during the flight of the aircraft so as to be efficiently cooled by the use of air alone.

The present invention contemplates the cooling of a central power unit in an aircraft which is located within the craft fuselage and capable of direct and continuous attention by an operator. This cooling is accomplished by providing an air duct about the cylinders having an inlet and an outlet, and motor-operated blower or fan means for moving air through the duct. Each cylinder has a separate water spray means, connected with a common water header located on the outside of the air duct, and including a pair of spray portions located on opposite sides of a corresponding cylinder to direct a water spray toward the cylinder. The water spray thus directed toward a cylinder is evaporated by the heat which it removes from the cylinder, and this water vapor is mixed with and carried by the air outwardly from the air duct. By virtue of the latent heat of evaporation of the water a large amount of heat is thus taken from the cylinders to efficiently cool the same. The extent to which a cylinder is cooled in this manner may be selectively controlled by a valve means for an associated spray means adapted to control the supply of water to a spray means from the common header.

The water vapor is condensed adjacent the outlet of the air duct and carried to a suitable cooling unit, to be cooled to a predetermined temperature and is then returned to a common source of supply from which it is pumped to the common header for the spray means. The water used for cooling is thus retained in a closed circuit. The air passing from the duct outlet may also be cooled and returned to the duct inlet to be recirculated about the engine cylinders. The cooling system of this invention is thus seen to be comprised of but a few parts, relatively light in weight, compact in assembly and efficient in operation to in all provide a desirable cooling system for mobile craft engines. It is to be understood, however, that the use of this invention is not limited alone to this particular application.

Referring to the drawing there is illustrated in Figs. 1 and 2 an engine 10 having a plurality of cylinders 11 arranged in line longitudinally of the engine. A shaft for connection with an aircraft propeller (not shown) or other driven device is indicated at 12. The cylinders 11 are located within an air duct 13 of substantially inverted U-shape which extends longitudinally of the engine 10. The legs 14 of the U-shaped air duct 13 are secured to opposite sides of the engine 10 and project upwardly so as to be in substantial vertical alignment with corresponding sides of the engine 10. The base or connecting portion 16 between the legs 14 is centrally depressed, as shown in Fig. 3, to provide for the attachment of a spark plug 17 with each of the engine cylinders 11.

The duct is formed with an inlet 18 at one end and an outlet opening 19 at its opposite end. Located within the duct 13 at the inlet 18 is a fan 21 which is mounted directly on the shaft of a fan-operating motor 22. The motor 22 is carried on a spider or open frame member 23 which is supported within the duct inlet 18. At the outlet opening 19 there is provided a baffle means including a disc-shaped baffle plate 24 supported on the duct 13 over the openings 19 but spaced inwardly of the opening 19 (Figs. 1 and 4). In cooperative assembly with the baffle plate 24 is a second baffle member 26 of circular shape having an outwardly extending annular flange portion 27 at one end positioned about the opening 19 for securement to the duct 13, and an inwardly projecting annular flange 28 at the other end partially extended over the periphery of the baffle plate 24 but laterally spaced from this baffle plate. As clearly appears in Fig. 1 the baffle member 26 cooperates with the baffle plate 24 to form a serpentine passage 29 about the baffle plate 24 which connects the outlet opening 19 with the duct 13 for a purpose to be later explained.

Each cylinder 11 is individually associated with a water spray means 31 of substantially U-shape having leg portions 32 extended longitudinally of a corresponding cylinder and on opposite sides of such cylinder. The base portion of each spray means is connected to a corresponding feed line 33, all of which feed lines 33 are extended through the duct 13 and in turn are connected with a common water supply pipe or header 34 located outwardly of the duct 13 and positioned longitudinally of the engine 10. Each leg portion 32 is perforated along the side thereof opposite a corresponding cylinder 11 to direct a spray of water, as indicated in Fig. 2, towards such cylinder and in directions generally so that a water spray from each leg 32 covers about half a peripheral portion of a cylinder.

The header 34, at each junction thereof with a feed line 33, is provided with a valve unit 36 for selectively controlling the flow of water to a corresponding spray means 31. Water to the header is supplied from a water-receiving tank 37 through a pipe 38, the water being supplied under pressure by a pump 35 of a usual centrifugal or gear type. The pump 35 is connected for direct operation with an electric motor 39.

It is contemplated in the present invention that the water discharged from the spray means 31 be reused for cooling purposes, as will be later explained, and for this purpose there is provided a refrigerating or cooling unit indicated generally as 49 and including a reservoir or cooling tank 51 connected with the bottom of the duct 13 through openings 52. As a result all free water in the duct 13, which through gravity drops to the bottom of the duct, is drained into the tank 51 through the openings 52. Located within the tank 51 is a finned serpentine coil 53, carrying brine or other suitable coolant therein. The pipe 53 is connected at one end to the outlet 54 of a compressor unit 56 and at its other end 57 with the inlet to the compressor. The compressor 56 is operated by a motor 58 through a pulley and belt connection 59 as illustrated in Fig. 1.

In the operation of the cooling system of this invention the motors 22, 39 and 58 are operated concurrently to in turn provide for the concurrent operation of the fan 21, pump 35, and cooling unit 49, respectively. It is apparent, however, that the air and water are introduced into the duct 13 independently of each other. As a result of this concurrent operation an air flow is produced in the duct 13 concurrently with the discharge of a water spray from each of the spray means 31. By virtue of the spray means being directed toward a corresponding cylinder 11 the water is sprayed against a cylinder. This water removes heat from the cylinder to an extent defined by its latent heat of vaporization whereby to effectively cool the cylinder. The resultant water vapor is intermixed with the air flowing through the duct 13 and carried toward the outlet opening 19. A highly efficient cooling effect is thus accomplished by virtue of the evaporation of the water on contacting the cylinders 11 and the high heat-conducting characteristics of water.

It is apparent, of course, that with the water vapor mixed with the air in the duct 13 unless some means is provided for condensing the vapor from this air both air and water will pass outwardly from the opening 19. To conserve as much of this water vapor as possible for later reuse in the cooling of the cylinders 11 the leg portion 32', indicated in Figs. 1 and 2, is provided with perforations 61 for directing a cooling spray against the baffle member 26 and the baffle plate 24 to cool the same. Thus as the air and water vapor mixture strikes these baffle members the water vapor is condensed and drops downwardly to the bottom of the air duct 13 from where it drains through the openings 52 into the tank 51. Openings 52' are also formed between the flange portions 27 and 28 of the baffle member 26 to permit the water condensed on the members 24 and 26 to drain to the bottom of the duct 13. The serpentine passage 29 connecting the outlet 19 with the duct 13 and the overlapping position of the baffle member end 28 with respect to the baffle member 24 prevents any direct passage of water outwardly from the opening 19 as the result of the velocity of air in the duct 13, this water being splashed against either of the baffle members 24 and 28 and diverted downwardly to the bottom of the duct 13.

The water thus drained or received from the duct 13 is at a higher temperature than the water initially introduced into the spray means 31 by virtue of being heated in the cooling of the cylinders 11. This water is cooled to any desirable cooling temperature in the tank 51 by the operation of the refrigerating unit 49 and is gravity fed into the tank 37 through a connecting pipe 62.

An electric control system for the cooling system is indicated diagrammatically in Fig. 5 for battery operation, the battery being illustrated at 63. The motors 22, 39 and 58 are connected in parallel across the battery terminals and are provided with separate control switches 64, 66 and 67, respectively, which are mounted on a common control shaft 68 so as to be concurrently operated on the actuation of a switch control knob 69. Each of the switches 66 and 67 includes a sliding contact 71 and a rotatable contact arm 72. The switch 64 includes a contact arm 73 which is successively movable over a resistance 74. In this manner, on rotation of the knob 69 in a counterclockwise direction as indicated in Fig. 5, the motors 39 and 58 are maintained in continuous operation at a predetermined speed while the speed of the motor 22 is varied to provide for any desired rate of air flow in the duct 13.

Because of the in-line arrangement of the cylinders 11 in the air duct 13 it may sometimes happen that one of the cylinders may become overheated relative to the other cylinders or, because of the flow of air and vaporous mixture in one direction through the duct 13, that one cylinder 11 will be cooled more than the remaining cylinders. To provide for a uniform heating of the cylinders 11 each of the valve units 36 is independently operated to control the flow of water from a corresponding spray means 32 and in turn the cooling effect upon the cylinder 11 associated with the controlled spray means. This individual control of each spray means 32 can be made in conjunction with a variation in the rate of air flow in the duct 13 so as to give a wide degree of cooling effects for all of the cylinders 11 or for each individual cylinder.

In some cases the engine 10 may be operated under load conditions at which the water received in the tank 51 may be at a temperature at which no further cooling of this water is required. To eliminate any unnecessary operation of the refrigerating unit 49 at such times there is provided a thermostatic switch unit 76, connected in the circuit of the motor 58 between the motor 58 and the switch 67 as shown in Fig. 5, which includes a contact arm 77 and a movable bimetal contact arm 78. The switch 76 is carried in a thermal exchange relation on the pipe 62 connecting the tank 51 with the tank 37 and operates to open the circuit of the motor 58 when the water flowing through the pipe 62 is at a predetermined temperature.

From a consideration of the above description it is seen that the invention provides a cooling system for an engine in which cooling is accomplished by evaporating water directed against the engine portions to be cooled. The water system is entirely closed through the tank 37, pipes 38 and 34, the air duct 13, the tank 51 and the connecting pipe 62, with the refrigerating unit 49 being connected in this closed water system to always provide for the water being at an optimum temperature for cooling purposes. By virtue of the baffle means 24 and 26 at the outlet opening 19 in the air duct 13 an appreciable portion of the water vapor which would otherwise pass from this opening is reclaimed for circulation and reuse in the water system so as to eliminate any frequent refillings of the tank 37 and to further provide for a prolonged operation of the cooling system from a single filling of the tank 37. It is to be understood, also, that since relatively pure air is discharged from the opening 19 that this air can be conducted back to the inlet 18 for recirculation through the duct 13. This air normally is sufficiently cooled to a suitable cooling temperature by passing over and around the cooled baffle plate members 24 and 28.

Although the invention has been described with reference to a particular embodiment thereof it is to be understood that it is not to be so limited since modifications and changes can be made therein which are within the full intended scope of this invention as defined by the appended claims.

I claim:

1. A cooling system for an internal combustion engine having a plurality of cylinders to be cooled, passage means for carrying air about said cylinders, means for moving air through said passage means, a plurality of fluid spray means corresponding to said cylinders adapted to spray a cooling fluid on an associated cylinder and within said passage means, with said fluid being vaporized by the heat from said cylinders and mixed with said air, means for selectively controlling the operation of said spray means, and means for collecting free particles of said fluid for recirculating through said spray means.

2. A cooling system for a combustion engine having a cylinder to be cooled, passage means for carrying air about said cylinder, means for moving air through said passage means and about said cylinder, and means in said passage means adjacent said cylinder for directing a spray of cooling fluid toward said cylinder, with said fluid being vaporized by the heat from said cylinder to cool said cylinder, and the vaporous fluid carried away from said cylinder by said air.

3. A cooling system for a combustion engine having a plurality of cylinders to be cooled, an air duct, with said cylinders located within said air duct, means for moving air through said air duct, spray means within said air duct individual to each cylinder for directing a spray of cooling fluid toward a corresponding cylinder, a source of cooling fluid, means for individually controlling the flow of cooling fluid to said spray means, with the air flow in said air duct and the cooling fluid from said spray means coacting to cool said cylinders, means for receiving and cooling free particles of said cooling fluid after said cooling operation has been performed, and means for returning the cooled fluid to said source.

4. A cooling system for an engine having a cylinder to be cooled, an air duct having an outlet, with said cylinder located in said air duct, a water spray means in said air duct for directing a water spray against said cylinder, means for moving air through said air duct with the water sprayed against said cylinder being vaporized on removing heat from said cylinder, and said vaporized water mixed with said air, baffle means at said outlet, means for cooling said baffle means to condense the water vapor in the vaporous mixture at said outlet, and means for receiving and cooling the water from said air duct for recirculation through said spray means.

5. A cooling system for an engine having a cylinder portion to be cooled, an air duct, with said cylinder portion located in said air duct, means for moving air through said air duct, spray means having a pair of portions for spraying a cooling fluid in substantially opposite directions against said cylinder portion, with said cooling fluid being vaporized by the heat removed from said cylinder portion and mixed with said air to be carried away from said cylinder portion, a source of cooling fluid, and means for controlling the flow of cooling fluid from said source to said spray means to vary the cooling of said cylinder portion.

JOSEPH SEBO.